United States Patent [19]
Parkinson et al.

[11] Patent Number: 6,088,457
[45] Date of Patent: *Jul. 11, 2000

[54] METHOD AND APPARATUS FOR OVER THE AIR PROGRAMMING A COMMUNICATION DEVICE

[75] Inventors: David S. Parkinson, Santa Clara; Tim A. Williams, Danville, both of Calif.

[73] Assignee: Wireless Access, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/515,854

[22] Filed: Aug. 16, 1995

[51] Int. Cl.$^7$ ........................................... H04L 9/00
[52] U.S. Cl. ................. 380/270; 380/255; 713/182; 713/200; 455/68; 340/825.72
[58] Field of Search ..................... 380/4, 23, 25, 380/49, 50, 59, 10, 20, 21, 255, 257, 270, 271, 272, 273, 287; 359/142, 143, 145–148; 455/53.1, 54.1, 68, 69, 70; 340/825.72; 713/182, 200; 755/517

[56] References Cited

U.S. PATENT DOCUMENTS

| | | |
|---|---|---|
| 4,182,933 | 1/1980 | Rosenblum .................. 380/21 |
| 4,367,557 | 1/1983 | Stern et al. .................. 380/20 X |
| 4,613,901 | 9/1986 | Gilhousen et al. .................. 380/21 X |
| 4,644,351 | 2/1987 | Zabarsky et al. .................. 340/825.44 |
| 4,829,466 | 5/1989 | Davis et al. . |
| 4,910,510 | 3/1990 | Davis et al. .................. 340/825.44 |
| 5,073,767 | 12/1991 | Holmes et al. . |
| 5,463,382 | 10/1995 | Nikas et al. .................. 340/825.44 |
| 5,606,443 | 2/1997 | Sgambati .................. 359/143 |

OTHER PUBLICATIONS

"PCS 1900—Case Story" (copyright 1998) on www.ericsson.com on the Internet, no author given, 1998.

*Primary Examiner*—Bernarr E. Gregory
*Attorney, Agent, or Firm*—Blakely, Sokoloff, Taylor & Zafman LLP

[57] ABSTRACT

An over-the-air programming (OTAP) technique in which programming messages are sent to a communication device in order to change operational parameters in the communication device. These operational parameters may comprise functional characteristics of the communication device. The programming is secure in that the communication device is only responsive for a predetermined period of time when enabled.

69 Claims, 15 Drawing Sheets

| OTAP MESSAGE PREFIX | | |
|---|---|---|
| DATA TYPE | COUNT | DESCRIPTION |
| CHAR | 1-24 | CARRIER SPECIFIED PREFIX, INDICATING PROGRAMMING MESSAGE |

FIG. 4A

| PACKET TYPE CODE | DESCRIPTION |
|---|---|
| 0X00 | BASE CAP CODE |
| 0X10 | ADD NEW CAP CODE |
| 0X12 | DELETE CAP CODE |
| 0X14 | REVERT TO MANUFACTURED CONFIGURATION |
| 0X20 | SET FUNCTION ENABLE, TYPE AND NAME |
| 0X22 | SET EXTENDED ADDRESS ENABLE, TYPE AND NAME |
| 0XF0 | OTAP SUCCESS MESSAGE |
| 0XF2 | OTAP FAIL MESSAGE |
| 0XFF | END OF OTAP MESSAGE |

FIG. 4B

BASE CAP CODE

| DATA TYPE | COUNT | DESCRIPTION |
|---|---|---|
| BYTE | 1 | PACKET TYPE = 0X00 (BASE CAP CODE) |
| BYTE | 1 | PACKET LENGTH = 3 |
| BYTE | 1 | BITS 7-5: UNUSED (=0) |
| | | BITS 4-0: BITS 20-16 OF BASE CAP CODE |
| BYTE | 1 | BITS 7-0: BITS 15-8 OF BASE CAP CODE |
| BYTE | 1 | BITS 7-0: BITS 7-0 OF BASE CAP CODE |

FIG. 5

ADD NEW CAP CODE

| DATA TYPE | COUNT | DESCRIPTION |
|---|---|---|
| BYTE | 1 | PACKET TYPE = 0X10 (ADD NEW CAP CODE) |
| BYTE | 1 | PACKET LENGTH = 4 |
| BYTE | 1 | BITS 7-5: UNUSED (=0)<br>BITS 4-0: BITS 20-16 OF NEW CAP CODE |
| BYTE | 1 | BITS 7-0: BITS 15-8 OF NEW CAP CODE |
| BYTE | 1 | BITS 7-0: BITS 7-0 OF NEW CAP CODE |
| BYTE | 1 | EXTENDED ADDRESS ENABLE (0=DISABLE, 1=ENABLE) |

FIG. 6

| DELETE CAP CODE | | |
|---|---|---|
| DATA TYPE | COUNT | DESCRIPTION |
| BYTE | 1 | PACKET TYPE = 0X12 (DELETE CAP CODE) |
| BYTE | 1 | PACKET LENGTH = 3 |
| BYTE | 1 | BITS 7-5: UNUSED (=0)<br>BITS 4-0: BITS 20-16 OF CAP CODE TO DELETE |
| BYTE | 1 | BITS 7-0: BITS 15-8 OF CAP CODE TO DELETE |
| BYTE | 1 | BITS 7-0: BITS 7-0 OF CAP CODE TO DELETE |

FIG. 7

| REVERT TO MANUFACTURED CONFIGURATION | | |
|---|---|---|
| DATA TYPE | COUNT | DESCRIPTION |
| BYTE | 1 | PACKET TYPE = 0X14 (REVERT TO MANUFACTURED CONFIGURATION) |
| BYTE | 1 | PACKET LENGTH = 5 |
| CHAR | 5 | CHARACTER STRING = "RESET" |

FIG. 8

| SET FUNCTION ENABLE, TYPE AND NAME | | |
|---|---|---|
| DATA TYPE | COUNT | DESCRIPTION |
| BYTE | 1 | PACKET TYPE = 0X20 (SET FUNCTION ENABLE, TYPE AND NAME) |
| BYTE | 1 | PACKET LENGTH = 6 - (6+N) |
| BYTE | 1 | BITS 7-5: UNUSED (=0)<br>BITS 4-0: BITS 20-16 OF AFFECTED CAP CODE |
| BYTE | 1 | BITS 7-0: BITS 15-8 OF AFFECTED CAP CODE |
| BYTE | 1 | BITS 7-0: BITS 7-0 OF AFFECTED CAP CODE |
| BYTE | 1 | FUNCTION (0-3) |
| BYTE | 1 | TYPE<br>0=4-BIT BCD (NUMERIC-ONLY)<br>1=7-BIT ASCII<br>2=8-BIT BINARY<br>3=TDP |
| BYTE | 1 | FUNCTION ENABLE (0=DISABLE, 1=ENABLE) |
| CHAR | 0-N | SOURCE NAME STRING (N CHARACTERS, PRESENT IF FUNCTION ENABLED) |

SET EXTENDED ADDRESS ENABLE, TYPE AND NAME

| DATA TYPE | COUNT | DESCRIPTION |
|---|---|---|
| BYTE | 1 | PACKET TYPE = 0X22 (SET EXTENDED ADDRESS ENABLE, TYPE AND NAME) |
| BYTE | 1 | PACKET LENGTH = 7 - (7+N) |
| BYTE | 1 | BITS 7-5: UNUSED (=0)<br>BITS 4-0: BITS 20-16 OF AFFECTED CAP CODE |
| BYTE | 1 | BITS 7-0: BITS 15-8 OF AFFECTED CAP CODE |
| BYTE | 1 | BITS 7-0: BITS 7-0 OF AFFECTED CAP CODE |
| BYTE | 1 | FUNCTION (0-3) |
| BYTE | 1 | EXTENDED ADDRESS |
| BYTE | 1 | TYPE<br>0=4-BIT BCD (NUMERIC-ONLY)<br>1=7-BIT ASCII<br>2=8-BIT BINARY<br>3=TDP |
| BYTE | 1 | FUNCTION ENABLE (0=DISABLE, 1=ENABLE) |
| CHAR | 0-N | SOURCE NAME (N CHARACTERS, PRESENT IF EXTENDED ADDRESS ENABLED) |

| OTAP SUCCESS MESSAGE | | |
|---|---|---|
| DATA TYPE | COUNT | DESCRIPTION |
| BYTE | 1 | PACKET TYPE = 0XF0 (OTAP SUCCESS STRING) |
| BYTE | 1 | PACKET LENGTH = 1-N |
| CHAR | 1-N | OTAP SUCCESS MESSAGE STRING |

FIG. 11

IF THE OTAP OPERATION IS NOT SUCCESSFUL, THIS IS THE MESSAGE DISPLAYED FOR THE USER TO INDICATE THAT THE PROGRAMMING FAILED, AND WHAT ACTION SHOULD BE TAKEN.

| OTAP FAIL MESSAGE | | |
|---|---|---|
| DATA TYPE | COUNT | DESCRIPTION |
| BYTE | 1 | PACKET TYPE = 0XF2 (OTAP FAIL STRING) |
| BYTE | 1 | PACKET LENGTH = 1-N |
| CHAR | 1-N | OTAP FAIL MESSAGE STRING |

FIG. 12

| END OF OTAP MESSAGE | | |
|---|---|---|
| DATA TYPE | COUNT | DESCRIPTION |
| BYTE | 1 | PACKET TYPE = 0xFF (END OF OTAP MESSAGE) |
| BYTE | 1 | PACKET LENGTH = 0 |

FIG. 13

METHOD AND APPARATUS FOR OVER THE AIR PROGRAMMING A COMMUNICATION DEVICE

FIELD OF THE INVENTION

This invention relates to communication devices; more particularly, the present invention relates to the programming of portable wireless communication devices over the air waves.

BACKGROUND OF THE INVENTION

Paging devices and other portable wireless communication devices have become increasingly popular. Each of these devices operate based on the manner in which they are configured.

Pagers are programmed to receive messages for preselected addresses, or cap codes. Every pager is initially programmed with a unique base cap code that is used to send messages to that pager only. That is, each pager has a unique address that is specific to itself. Using this unique address, messages may be sent to the pager. Certain high-end pagers may have two, four or even sixteen different addresses. These addresses may include one or more group addresses that enables a single message to be sent by a carrier to multiple pagers at the same time. This saves carrier air time in that every device programmed to that address is able to receive that message.

The paging receiver may also be responsive to information service addresses from service providers. In this case, the paging receiver is programmed to receive information that is sent by service providers to the receiver corresponding to the specific information service being used.

Once a paging receiver is out in the field, it is often desirable to alter its operational parameters. These parameters may include the personal, group or information service addresses that the receiver recognizes or may include parameters related to the functioning of the pager. Typically, these parameters are set in the receiver at the time of manufacturing via special purpose programming hardware and software. It is also common for service providers to have programming hardware and software which allows them to physically connect to a paging receiver and modify the parameters using hardware and software in order to configure a unit prior to sending it out to a customer.

A problem arises when changes need to be made to the parameters. Changes may be required due to a customer request or a change in the service providers network. A change to the service providers network may include activating or deactivating specific services available to a particular paging receiver to add or delete a service, respectively, available to the receiver. Furthermore, a change may include deactivating the entire unit. Furthermore, specific functions of the paging receiver may be enabled or disabled through the use of programming.

In order to reprogram a paging receiver, a paging receiver typically must be returned to the service provider or manufacturer for reconfiguration. This usually entails packaging the paging receiver and sending it to a specific location. This can be very cumbersome and costly. Once at the location, a serial port connection is normally hooked to the paging receiver to facilitate the programming.

In the prior art, paging receivers have been programmed over the air. Such programming involves patching values into specific memory locations. This resulted in a large burden on the service provider. This is a burden because for each paging device supported by the service provider, there is an associated "memory map" for the data values that can be altered. This memory map must be retained by the service provider and used in the creation of the programming message for each device that uses this prior art over-the-air programming method. To add an address, for example, the service provider is required to determine the specific memory location(s) within the paging device that must be changed (from the memory map for that device) and include that information in the programming message sent to the pager. It is desirable to allow for over the air programming of a paging receiver to avoid the cost and hassle of sending the paging receiver into some predetermined location while also reducing the burden placed on the service provider.

Manufacturers and service providers desire a level of security when it comes to programming a paging receiver. Manufacturers and service providers want to prevent any average sender from sending messages that look like a programming message to devices. In this manner, the manufacturer and service providers are able to avoid unauthorized changes to the paging receiver.

The present invention provides for over-the-air programming of a communication device without the need to forward the communication device to the manufacturer for programming. Furthermore, the present invention provides for over-the-air programming that does not place a large burden on the service providers and provides a secure manner in which to program the paging receiver.

SUMMARY OF THE INVENTION

A method and apparatus for programming a portable wireless communication device is described. The present invention includes a method and apparatus for enabling a programming time period during which the communication device is responsive to programming messages. The programming time period is enabled over the air. The present invention also provides a method and apparatus for receiving programming messages over the air during the programming time period. The present invention also includes a method and apparatus for changing operational parameters of the communication device based on information in the received message.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 4A illustrates one embodiment of a message prefix used in the over the air programming according to the present invention.

FIG. 4B illustrates one embodiment of the packet type codes used to identify multiple packet types.

FIG. 5 illustrates one embodiment of a message for specifying the base cap code.

FIG. 6 illustrates one embodiment of a message for adding a new cap code.

FIG. 7 illustrates one embodiment of a message for deleting a cap code.

FIG. 8 illustrates one embodiment of a message to revert the paging receiver to a manufactured configuration.

FIG. 9 illustrates one embodiment of a message to set a function in the communication device.

FIG. 10 is one embodiment of a message to set an extended address for the paging receiver.

FIG. 11 illustrates one embodiment of a success message.

FIG. 12 illustrates one embodiment of a failed message.

FIG. 13 illustrates one embodiment of an end of message.

DETAILED DESCRIPTION OF THE PRESENT INVENTION

A method and apparatus for programming portable wireless communication devices over the air is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Overview of the Present Invention

The present invention provides for over the air programming (OTAP) of wireless devices, such as pagers. The OTAP of the present invention allows changes to be made to operational parameters of a portable wireless communication device over the air waves. This is essential for parties that wish to modify communication devices after they are out in the field. Without OTAP, communication devices would have to be returned to the service provide or manufacture for reconfiguration.

In one embodiment, the OTAP of the present invention may be used to add a service/address to a pager receiver, to delete a service/address or to deactivate a unit, or to enable/disable functions in the paging receiver.

The OTAP method of the present invention is simple for service providers to implement while being secure to prevent unauthorized modifications. To prevent unauthorized modification of the parameters, the OTAP sequence and messages are designed, such that only the service provider can send valid OTAP updates. One embodiment of the OTAP sequence is described in FIGS. 1 and 2.

Figure 1:
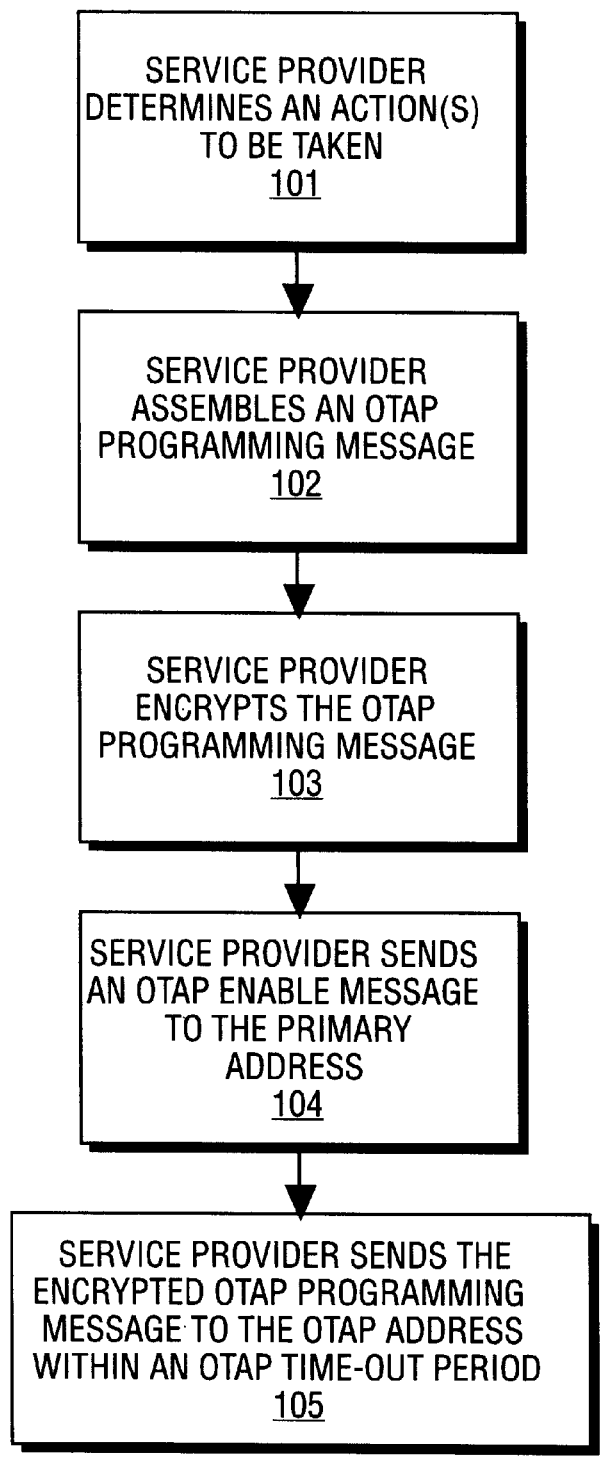
FIG. 1 illustrates a flow chart of one embodiment of the process of a service provider or other party performing over-the-air programming according to the present invention.

FIG. 1 illustrates the OTAP sequence performed by the service provider according to the present invention. Referring to FIG. 1, the service provider initially determines an action(s) to be taken (processing block 101). The service provider may determine actions to be performed based on customer requests, a change in the network, etc.

After determining which action is to be taken, the service provider assembles an OTAP programming message using OTAP data packets, as described in more detail below (processing block 102). Next, the service provider encrypts the OTAP programming message (processing block 103) and sends an OTAP enable message to the primary address of the communication device being programmed (processing block 104). In one embodiment, the enable message is a unique OTAP message that is sent by the service provider to the primary (or base) address of a paging receiver being programmed. Thereafter, the service provider sends the encrypted OTAP programming message to the OTAP address within a predetermined time-out period (e.g., window), which is described in more detail below (processing block 105).

Figure 2:
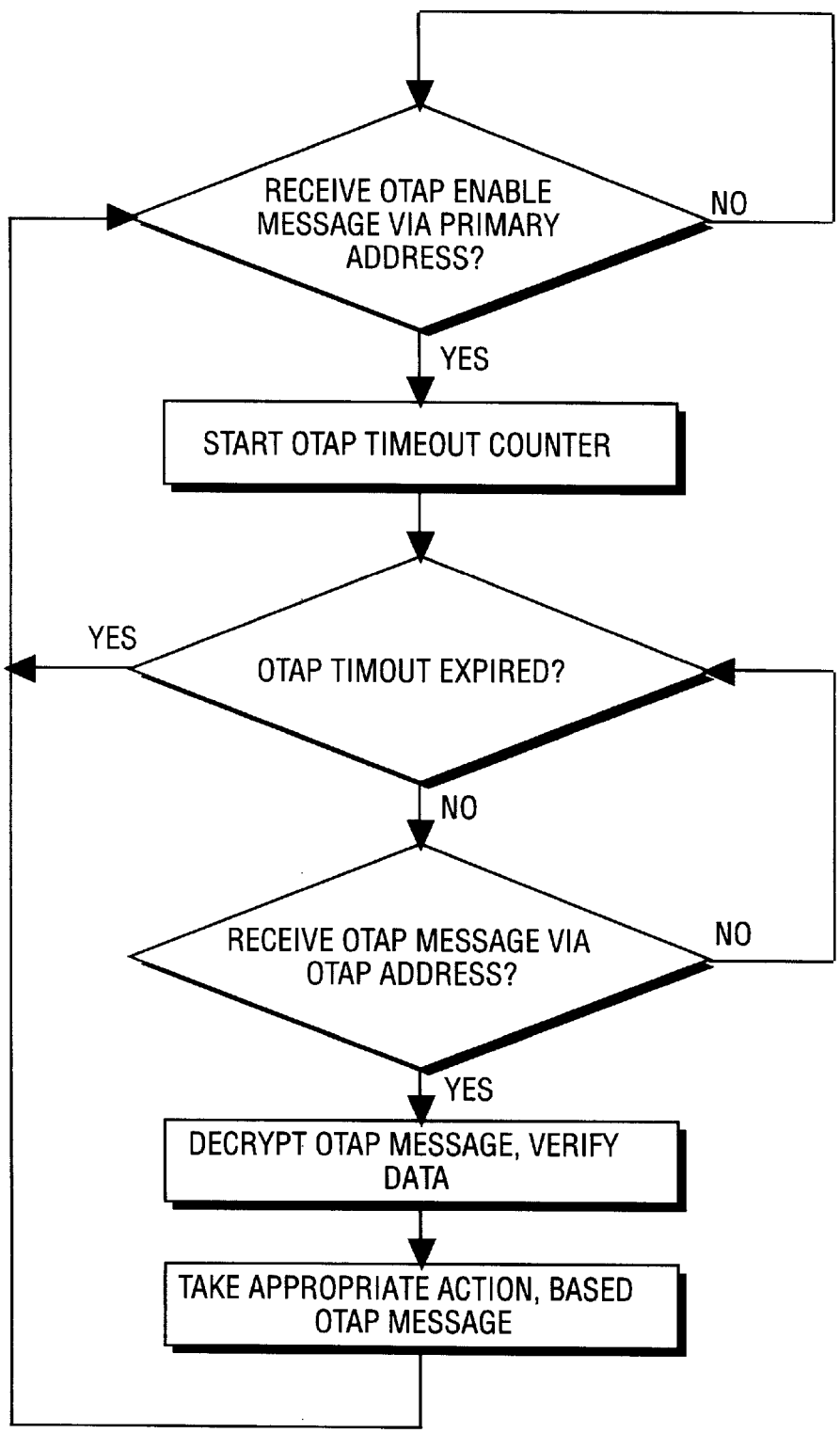
FIG. 2 illustrates a flow chart of one embodiment of the over-the-air programming sequence of the receiver.

FIG. 2 illustrates the OTAP sequence of the present invention performed by the communication device (e.g., paging receiver) being programmed. The device's OTAP sequence begins with a test to determine whether the device has received an OTAP enable message via a primary address (processing block 201). If the device has not received the OTAP enable message, then processing remains at processing block 201. However, if the device has received the enable message, processing continues at processing block 202 where the device resets a timer with a programmable time out and enables the timer to begin counting.

Next, a test determines if the OTAP time out has expired (processing block 203). If the OTAP time out period has expired, processing continues at processing block 201. However, if the OTAP time out period has not expired, processing continues at processing block 204 where a test determines whether the device has received an OTAP programming message via the OTAP address. If the device has not received the OTAP programming message, then processing loops back to processing block 203. However, if the device has received an OTAP programming message, then processing continues at processing block 205. It should be noted that an OTAP programming message can be received on the OTAP address anytime after the reception of the OTAP enable message until the timer expires.

As soon as the OTAP programming message is received, it is decrypted and the data verified (processing block 205). After decrypting the OTAP programming message, the devices executes in the appropriate action based on the contents of the OTAP message (processing block 206). After taking the appropriate action, processing loops back to processing block 201.

In one embodiment, as soon as the OTAP programming message is received, the OTAP address is again disabled. That is, once one programming message has been received, the communication device cannot receive another programming message until re-enabled by receipt of another enable message. Note that without the OTAP enable, messages sent to the OTAP address are completely ignored by the communication device.

Since the service provider controls what addresses are used for messages, only the service provider can send a message to the OTAP address. The data contained in the OTAP messages itself also contains the primary address of the communication device being addressed and the message is also encrypted. These features help to ensure the security of the programming. The communication device decrypts the OTAP message, verifies that the message is intended for itself and acts on the programming information that has been sent.

When a reserve channel (from pager to service provider) is present, the programming information can be verified and confirmed via the reverse channel. In one embodiment, this is accomplished by having the pager compute a checksum or CRC using the new programming data, and sending the result back to the network.

One Embodiment of the Communication Device of the Present Invention

Figure 3:
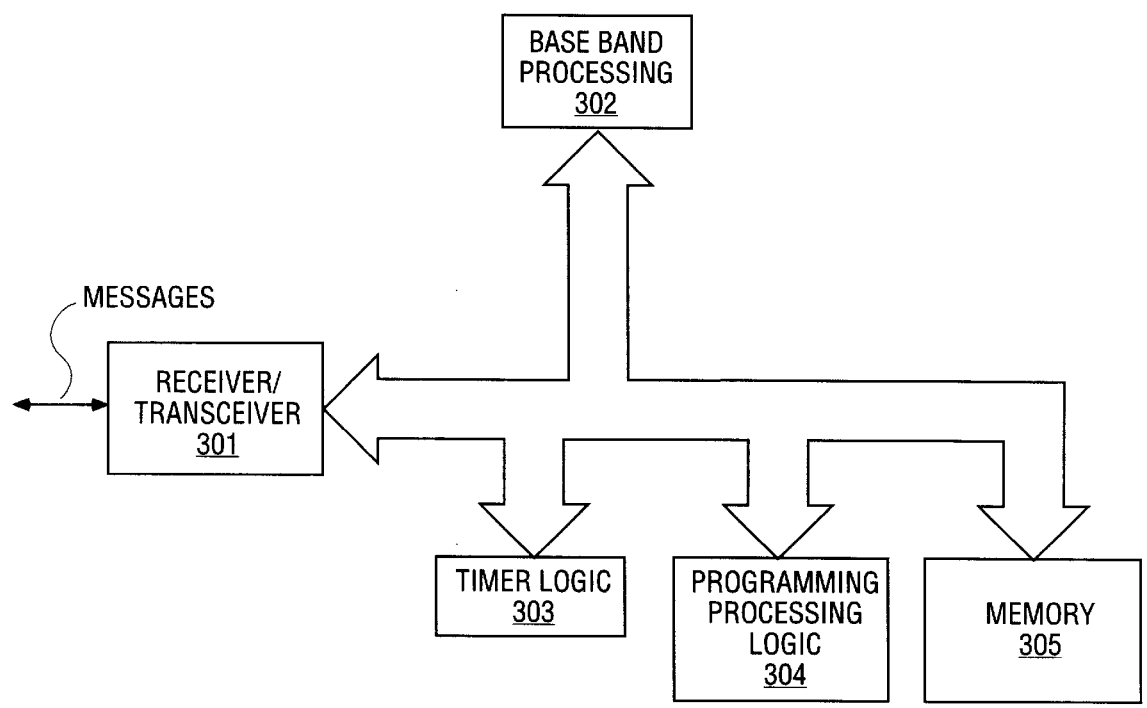
FIG. 3 is a block diagram of a pager of the present invention.

The communication device of the present invention may comprise a pager, such as pager 300 shown in FIG. 3. Referring to FIG. 3, pager 300 includes paging receiver/transceiver hardware 301 that includes RF processing logic and an antenna, baseband processing logic 302, timing logic 303, programming processing logic 304 and at least one memory, such as memory 305. It should be noted that any or all of the baseband processing 302, timer logic 303 and programming processing logic 304 may be combined into a single processing component. In one embodiment, memory 305 comprises a non-volatile memory that stores the base address of pager 300 as well as other service, group or personal addresses. Pager 300 may comprise a PCMCIA paging receiver, a belt-top pager, etc.

In the present invention, pager 300 has a programming address that is stored within memory 305. This programming address may be set through a carrier system configuration operation prior to use of pager 300 by a user. In one embodiment, the programming address is the same for all pagers. In an alternate embodiment, the programming address is different for all pagers. In the present invention, the only requirement is that the carrier know what programming address is associated with a given pager.

In the present invention, pager 300 does not respond to messages sent to the programming address unless it is specifically enabled to allow such messages to be received. This enabling is achieved with a message sent to the unique base address of pager 300 that opens up a window of time (e.g., five minutes) during which pager 300 can receive messages sent to the programming address. Timer logic 303 is responsive to the OTAP enable message and starts a timer having a predetermined time-out. While timer logic 303 does not time-out, a programming message may be received by pager 300. Once the time-out has expired, a signal from timer logic 303 disables programming processing logic 304. In an alternate embodiment, timer logic 303 signals, directly or indirectly, programming processing logic 304, thereby causing programming processing logic 304 to ignore programming messages. Note that the use of a programming "window" could result in power savings, dependent on the protocol is use and the implementation, because pager 300 only looks for programming messages after an enable message.

After an enabling message has been sent to pager 300, programming information is sent to pager 300 via messages addressed to the programming cap code. In one embodiment, the unique base address (e.g., cap code) of pager 300 is included as part of the information in each programming message that is sent to pager 300. This further ensures that only the intended communication device uses the programming information.

In one embodiment, a final message in a sequence of programming messages that is sent to the programming address also includes a cyclical redundancy check (CRC) that is used to verify the information sent in the previous messages. In one embodiment, no changes to the address of pager 300 are effective until this last message is received and the information is verified.

In one embodiment, the programming processing logic 304 decodes the action and is capable of adding/deleting addresses and services of pager 300, deactivating pager 300 (such as when, for instance, there is a delinquency in the pager's account with the service provider), or enabling/disabling functions of pager 300 based on and in response to programming messages. Other operational parameters may be modified, such as the duty cycle (on/off times) of pager 300, user alerts, or turning on/off a beeper. Other parameters may include, but are not limited to: out-of-range timeout values, maximum length of messages that can be received, and message format options (to change the way in which certain messages are displayed to the user). For two-way pagers, other parameters may include, but are not limited to: registration timeout values, number of registration retries, and reverse channel parameters (such as frequency and baud rate). (Registration refers to the process of a two-way pager altering the service provider's network to the pager's presence via the reverse channel).

After reception of the final programming message, pager 300 no longer responds to messages sent to the programming address unless another enable message is sent to the unique base address to re-enable programming. In addition, if pager 300 does not receive a valid sequence of programming message within the window of time in which it is enabled for programming, it will discontinue responding to messages sent to the programming address until re-enabled with the appropriate message to its unique base address.

In the present invention, software within pager 300 (e.g., programming processing logic 304) contains information on how pager 300 processes the incoming data for a given address in order to change operational parameters. Such software being responsive to commands to change functional characteristics within a communication device (e.g., pager) is well-known in the art. By having the software in pager 300 be responsible for configuration information, only a minimal amount of information needs to be actually transmitted to pager 300. Furthermore, the software can be easily updated with any new service information. The new service information could be contained in files at the base station of the paging system which would be accessed on an individual basis via the dial-in option or transmitted to the users as required individually or as a group.

One Embodiment of OTAP Messages

In the present invention, an OTAP message comprises one or more packets of data. In one embodiment, the OTAP message includes a prefix indicating that the message corresponds to over-the-air programming. One embodiment of the message prefix is shown in FIG. 4A. In an alternate embodiment, no such prefix is received where a specific programming address in the pager is used for all OTAP messages. Also, a prefix may not be required where function bits are used to indicate a programming message.

Each packet contains information pertaining to new or existing addresses (e.g., cap codes) in the communication device (e.g., paging receiver). For a pager, all OTAP messages after the prefix (if any) start with the base cap code packet. The base address is the unique address of the pager which cannot be changed. In one embodiment, all OTAP messages end with the OTAP end of message packet. The OTAP message prefix may or may not be encrypted, but all subsequent packets in the message are encrypted.

In one embodiment, the format of an OTAP packet includes packet type, packet length and packet data fields. The packet type indicates one or more actions to be taken (e.g., add an address, delete an address, etc.). In the embodiment described below, each packet type field only includes one specific action. The packet length indicates the total length of the packet data and may not be required for fixed length packets; however, for variable length packets, it may be required to identify the amount of programming information being received. The packet data comprises actual information to be used (e.g., the new address to be added, the address to be deleted, etc.). The packet data may include a name of a new information service, data types associated with a new address, timeout values for out-of-range indication. Those skilled in the art would appreciate other information that may be desirable to include. Note that a specific memory location to store the address does not have to be specified to pager 300 (i.e., no direct addresses of memory 305); it is responsible for storing the address. Example packets are shown in FIGS. 5–13.

In one embodiment, the OTAP message is formatted such that all information is communicated in printable 7-bit ASCII characters. This allows the programming message to be compatible with the alphanumeric protocols commonly used in paging systems. A character is used for names, message strings, etc., and ranges in value from 32 to 127. In an alternate embodiment, the information is transmitted using bytes. A byte is bits of data which is used for addresses, function enables, etc., ranging value from 0–255. Note that in both cases, the information content is the same. In one embodiment, the packet data field of an OTAP message may be in either character or byte data. However, both the packet type and packet data length fields are in byte data. Note that for character data type, character strings should not be null terminated.

In a 7-bit ASCII format, a byte is transmitted using ASCII-encoded hex. This requires two 7-bit characters for each byte. For example, the decimal value 90 (5A in HEX) would be sent as two 7-bit characters, a "five" followed by an "A". Each time a byte is called out in the message format, two 7-bit characters are used to actually send the data. On the other hand, in a 7-bit ASCII format, a character is transmitted using one 7-bit ASCII character. All values are in printable ASCII range. Therefore, there is no problem sending the character with 7-bit ASCII format. For each character called out in the OTAP message format, one 7-bit character is used.

In order to implement an 8-bit binary format, a byte is represented by one 8-bit word. A character, however, is sent using this lower 7-bits of the 8-bit word, where the most significant bit (msb) is always zero. For each character used in the message format, 8 bits are used to send the value.

In the present invention, pagers are initially configured with carrier specified OTAP parameters at base address programming time. This enables OTAP messages to be sent. The carrier specified OTAP parameters may include an OTAP function that specifies the value of the function bits that are sent along with the base address and the address for the OTAP message. In one embodiment, the value for the OTAP function will be one that is not used for normal messages. Another carrier-specified OTAP parameter may include an OTAP message prefix which is a carrier specified alphanumeric string of one to four characters long that identifies a message as an OTAP message. This prefix could become into all the pagers within a carrier's network or be unique to each pager. An OTAP message type also may be a carrier-specified OTAP parameter that indicates if OTAP messages will be sent using 7-bit ASCII format or 8-bit binary format.

Regardless of the OTAP format used, all information following an OTAP prefix can be encrypted. Note that various encryption techniques may be used. To accommodate the over-the-air programming, the encryption method results in values for the 7-bit ASCII format that are within the range of printable characters. Any encryption method producing such results may be used. Note that the OTAP message formats in FIGS. 5–13 are described without regard to the encryption mechanism (the messages that exist prior to encryption and after decryption).

FIG. 4B illustrates one embodiment of the packet type codes associated with the various functions that may be performed to change operational parameters. As shown, the various packet type codes include a base cap code, add new cap code, delete cap code, revert to manufacturer configuration, set the function enable, type and name, set extended address enable, type and name, OTAP success message, OTAP fail message, and end of OTAP message.

FIG. 5 illustrates one embodiment of a base cap code message. FIG. 6 illustrates one embodiment of an add new cap code message. In one embodiment, when a new cap code is added, all functions in extended addresses are disabled by default. That is, when a new address is added, all sub-addresses and extended addresses associated with that new address are disabled by default. This means that each sub-address or extended address that is to be used must be specifically enabled by the service provider. (This is a precaution to prevent enabling more addresses than is desired.)

FIG. 7 illustrates one embodiment of a delete cap code message. FIG. 8 illustrates one embodiment of a "revert to manufacturer configuration" message. If this packet is sent, the paging receiver reverts to the configuration that was programmed into it at the time of manufacturing.

FIG. 9 illustrates one embodiment of a set function enable, type and name message. FIG. 10 illustrates one embodiment of a set extended address enable, type and name message. Note that in both FIGS. 9 and 10, an address and function may be equated to that of a "sub-address". The "function enable" refers to whether this particular sub-address is enabled (can receive mesages sent to the sub-address) or disabled (can't receive messages sent to the sub-address). The "type" refers to the data type associated with the sub-address (e.g., 7-bit ASCII, 4-bit BCD, 8-bit binary). The "name" is the character string used to identify the particular sub-address (analogous to a file folder name).

FIG. 11 illustrates one embodiment of an OTAP success message. If the OTAP operation is successful, this message is displayed to the user to indicate that the programming has been completed. FIG. 12 illustrates one embodiment of the OTAP fail message. If the OTAP operation is not successful, the OTAP fail message is displayed for the user to indicate that programming has failed. Programming may fail, for instance, where the programming attempts to add another cap code to a pager whose memory is full. In one embodiment, the OTAP fail message also indicates what action should be taken. For instance, the fail message may provide a phone number to contact to handle any existing problem. One example of a problem that may result in generation of a fail message is an attempt to add a new address to a pager that cannot support any additional addresses. In this case, the programming action cannot be completed, resulting in the display of the OTAP fail message. This would allow the user to contact the service provider and take corrective action.

FIG. 13 is one embodiment of the end of OTAP message. An end of message may not be required in all embodiments. For instance, an end of memory is not required where the end of a message is signaled by the beginning of a new message.

In an alternate embodiment, the communication device is initially configured with information that is enabled or activated by a programming message. Once accessed, the communication device functions according to the information already stored therein as if a feature was "activated" by the programming message.

An Example OTAP Message

The following illustrates an example of an OTAP message that adds a new cap code (extended address and disable) and enables four associated functions.

Carrier Specified Parameters:
 OTAP Prefix: OTAP
 OTAP Message Type: 7-bit ASCII Base Cap Code: 1234567 (hex 12D687)
New Cap Code: 1234568 (hex 12D688)
  Function 0 enables, name="Function 0", type=7-bit ASCII
  Function 1 enables, name="Function 1", type=4-bit BCD
  Function 2 enables, name="Function 2", type=7-bit ASCII
  Function 3 enables, name="Function 3", type=7-bit ASCII
In the following message, new lines are shown between each packet and italicized comments are included for clarity, but are not actually part of the OTAP message.
Message (alphanumeric characters sent prior to encryption):

| | |
|---|---|
| OTAP | OTAP Prefix |
| 000312D687 | Base Cap Code Packet |
| 100412D68800 | Add New Cap Code Packet |
| 201012D688000101Function 0 | Set Function Enable, Type and Name Packet |
| 201012D688010001Function 1 | Set Function Enable, Type and Name Packet |
| 201012D688020101Function 2 | Set Function Enable, Type and Name Packet |
| 201012D688030101Function 3 | Set Function Enable, Type and Name Packet |
| F012New Cap Code Added | OTAP Success Message Packet |
| F21CCall 1-800-WAI-OTAP for help | OTAP Fail Message Packet |
| FF00 | End of OTAP Message Packet |

Note that by enabling multiple communication devices at the same time by sending an enable message to these devices simultaneously (e.g., by group address), the present invention may be able to perform group programming.

Overview of the Paging System of the Present Invention

The over-the-air programming of the present invention may be implemented for use with pagers in a one-way or two-way paging system. In other words, the communication device of the present invention may be designed for use in a one-way paging system or in a two-way paging system. In a one-way paging system, a computer, server, or other control device is interfaced to a transmitter in the paging system and initiates transmission of paging messages. The transmitter, via links to a satellite and one or more base transceivers, sends these paging messages to pagers.

Figure 14:
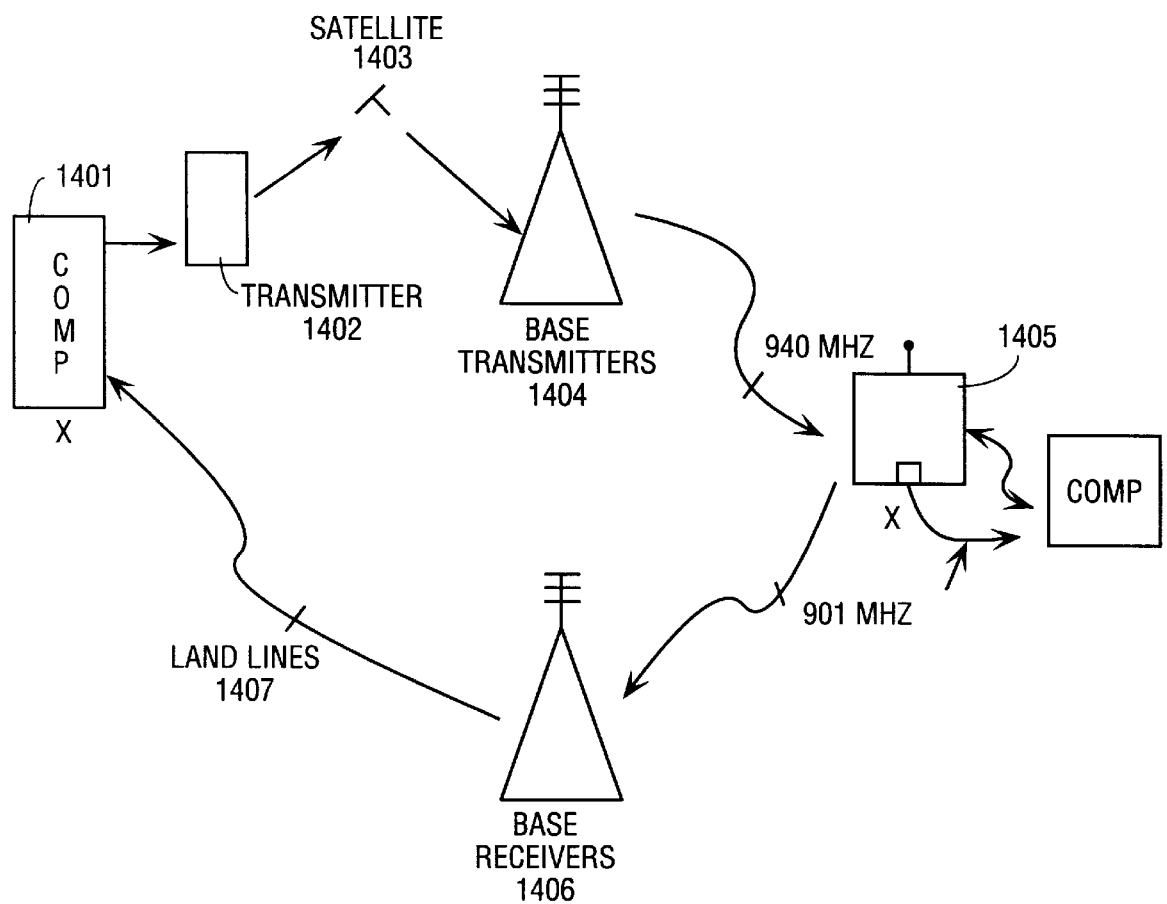
FIG. 14 illustrates one embodiment of the two-way paging system of the present invention.

In a two-way paging system, such as is shown in FIG. 14, these same components comprise the same communication path to the pager. Referring to FIG. 14, a computer or other control device 1401 interfaces with a paging transmitter 1402 (via, for instance, the Internet or some other network), transmitter 1402 sends paging messages using satellite 1403, and in turn, satellite 1403 transmits the paging messages to base transmitter 1404 for forwarding onto pager 1405. In one embodiment, the communication between base transmitter 1404 and pager 1405 occurs at 940 MHz. Pager 1405 includes transmitter functionality that allows for transmitting messages over air waves at 901 MHz to base receiver 1406. Such functionality is well-known in the art. Base receiver 1406 uses land lines to transmit the messages to the control device 1401.

In sum, the over-the-air programming method of the present invention comprises a straight forward implementation that allows for reconfiguration of operational parameters of a communication device. The present invention provides different levels of security that can be used to prevent abuse and/or unauthorized changes or accesses.

Furthermore, the present invention provides for an alternative approach to the prior art over-the-air programming, which does not require the service provider to include device-specific memory map information in the programming message. Instead, a programming message is sent that instructs the pager to "add an address," along with the necessary information pertaining to that new address. This method allows the same programming messages to be sent to a whole class of different devices, regardless of how the programming information is ultimately stored within the device.

In one embodiment, the present invention is performed without the OTAP enable and OTAP address. In such a case, the primary address of the pager (communication device) can serve as the OTAP address. Furthermore, when the present invention is used with the OTAP enable and the OTAP address, only one OTAP address is required for the entire network. That is, all units can be programmed with the same OTAP address. A tradeoff may be made in the present invention between the ease of service provider implementation versus security available.

Moreover, by divorcing the OTAP messages from the hardware of the communication device, the scheme is extensible and can be used with different versions of a product and a cross range of products.

Whereas many alterations and modifications of the present invention will no doubt become apparent to a person of ordinary skill in the art after having read the foregoing description, it is to be understood that the particular embodiment shown and described by way of illustration is in no way intended to be considered limiting. For instance, the programming time period of the present invention could be enabled during a specific pre-programmed time slot, by, for example, a user-initiated event, or via another connection to the device (e.g., a serial port). Further, the programming of the present invention could be by a physical connection, such as a serial port, or an infra-red connection, for information transfer. Therefore, references to details of the various embodiment are not intended to limit the scope of the claims which in themselves recite only those features regarded as essential to the invention.

Thus, a method and apparatus for over-the-air programming of a communication device has been described.

We claim:

1. A method for programming a radio frequency paging device, said method comprising the steps of:
   establishing a programming time period during which the radio frequency paging device will be responsive to programming messages;
   receiving a programming message during the programming time period; and
   changing an operational parameter of the radio frequency paging device based on information in the programming message.

2. The method defined in claim 1 wherein the step of establishing a programming time period comprises:
   receiving an enable message that is being transmitted over the air; and starting the programming time period in response to the enable message.

3. The method defined in claim 2 further comprising the step of the radio frequency paging device receiving a unique message to enable receipt of programming messages.

4. The method defined in claim 3 further comprising the step of sending the unique message to a base address of the radio frequency paging device.

5. The method defined in claim 1 further comprising the step of ignoring programming messages if not received by the radio frequency paging device during the programming time period.

6. The method defined in claim 1 further comprising the step of decrypting the programming message.

7. The method defined in claim 1 further comprising the step of verifying data in the programming message to determine whether the programming message is designated for the radio frequency paging device.

8. The method defined in claim 1 further comprising the step of decoding at least one field of one or more packets of the programming message to determine an action to be taken by the radio frequency paging device.

9. The method defined in claim 1 further comprising the step of disabling a programming address in the radio frequency paging device once the programming message has been received.

10. The method defined in claim 9 wherein the programming address is disabled in the radio frequency paging device until re-enabled by another enable message.

11. The method defined in claim 1 wherein the step of receiving the programming message comprises receiving the programming message having a base address of the radio frequency paging device and having at least one packet that indicates an action to be taken and information for performing the action.

12. The method defined in claim 11 wherein the step of receiving the programming message further comprises the step of receiving said at least one packet having a length indicative of an overall length of the information necessary to perform the action.

13. The method defined in claim 1 further comprising the step of displaying a success message indicating programming has been completed successively.

14. The method defined in claim 1 further comprising the step of displaying a fail message indicating programming has failed.

15. The method defined in claim 14 further comprising the step of displaying an action to be performed by a user of the radio frequency paging device in response to the fail message.

16. The method defined in claim 1 wherein the step of changing the operational parameter comprises the step of adding an address to which the radio frequency paging device is responsive.

17. The method defined in claim 1 wherein the step of changing the operational parameter comprises deleting an address to which the radio frequency paging device is responsive.

18. The method defined in claim 1 wherein the step of changing the operational parameter comprises deactivating the radio frequency paging device.

19. The method defined in claim 1 wherein the step of changing the operational parameter comprises enabling or disabling at least one function of the radio frequency paging device.

20. The method defined in claim 1 further comprising the step of verifying programming information via a reverse channel.

21. The method defined in claim 20 wherein the step of verifying comprises:
the radio frequency paging device computing an error measure using the programming information; and
sending a result via the reverse channel for confirmation.

22. A method for programming a radio frequency paging device comprising the steps of:
assembling a programming message to program the radio frequency paging device;
sending an enable message over the air waves to a programming address of the radio frequency paging device to establish a programming time period during which the radio frequency paging device will be responsive to programming messages; and
sending the programming message over the air waves to a predetermined address associated with the radio frequency paging device during the programming timing period to change an operational parameter of the radio frequency paging device, the radio frequency programming device only responsive to the programming message during established programming time periods.

23. The method defined in claim 22 further comprising the steps of encrypting the programming message.

24. The method defined in claim 22 wherein the step of assembling the programming message comprises adding a base address of the radio frequency paging device to the programming message.

25. The method defined in claim 22 further comprising the steps of:
assembling at least one packet having a first field indicating an action to be performed and a second field having information that is used during the performance of the action in the first field.

26. A method for programming a radio frequency paging device comprising:
assembling a programming message to program the radio frequency paging device, wherein the step of assembling the programming message comprises assembling at least one packet having a first field indicating an action to be performed and a second field having information that is used during the performance of the action the first field, wherein said at least one packet includes a length field indicating the length of information in the programming message;
sending an enable message over the airwaves to the programming address of the radio frequency paging device; and
sending a programming message over the air waves to a predetermined address associated with the radio frequency paging device within a programming timing period.

27. A method for programming a radio frequency paging device comprising:
assembling a programming message to program the radio frequency paging device;
sending an enable message over the air waves to the programming address of the radio frequency paging device; and
sending a programming message over the air waves to a predetermined address associated with the radio frequency paging device within a programming timing; and
verifying programming information via a reverse channel.

28. The method defined in claim 27 wherein the step of verifying comprises:

the radio frequency paging device computing an error measure using the programming information; and sending a result via the reverse channel for confirmation.

29. A radio frequency paging device comprising:

a receiver to receive messages over the air waves;

timer logic coupled to the receiver and responsive to an enable message for establishing a time period during which the radio frequency paging device will be responsive to programming messages;

processing logic coupled to the receiver and the timer logic, said processing logic changing an operational parameter of the radio frequency paging device based on information in and in response to a programming message received by the receiver during the time period, and wherein the processing logic discontinues responding to programming messages after the time period has expired until re-enabled.

30. The radio frequency paging device defined in claim 29 wherein the receiver comprises a paging receiver.

31. The radio frequency paging device defined in claim 29 wherein the receiver comprises a paging transceiver.

32. The radio frequency paging device defined in claim 29 wherein the processing logic is re-enabled by another enable message.

33. The radio frequency paging device defined in claim 29 wherein the processing logic decodes a programming message and executes an action specified therein.

34. The radio frequency paging device defined in claim 33 wherein the action comprises adding an address.

35. The radio frequency paging device defined in claim 33 wherein the action comprises deleting an address.

36. The radio frequency paging device defined in claim 33 wherein the action comprises deactivating the radio frequency paging device.

37. The radio frequency paging device defined in claim 33 wherein the action comprises enabling or disabling a function.

38. The radio frequency paging device defined in claim 33 wherein the timer logic prevents the processing logic from being responsive to programming messages.

39. A method for adding a new cap code to a radio frequency paging device comprising the steps of:

establishing a programming time period during which the radio frequency paging device will be responsive to programming messages;

receiving a programming message during the programming timing period, wherein the programming message specifies the new cap code to which the radio frequency paging device will be responsive; and the radio frequency paging device programming itself using information in the programming message to be responsive to the new cap code.

40. A method for deleting an existing cap code to a radio frequency paging device comprising the steps of:

establishing a programming time period during which the radio frequency paging device will be responsive to programming messages;

receiving a programming message during the programming timing period, wherein the programming message specifies for deletion the existing cap code to which the radio frequency paging device is currently responsive; and the radio frequency paging device programming itself using information in the programming message to no longer be responsive to the existing cap code.

41. A method for reverting to a preprogrammed configuration that was programmed into the radio frequency paging device said method comprising the steps of:

establishing a programming time period during which the radio frequency paging device will be responsive to programming messages;

receiving a programming message during the programming timing period, wherein the programming message sets forth that the radio frequency paging device is to revert back to the preprogrammed configuration; and the radio frequency paging device programming itself using information in the programming message to revert back to the preprogrammed configuration.

42. A method for enabling a new function for a radio frequency paging device comprising the steps of:

establishing a programming time period during which the radio frequency paging device will be responsive to programming messages;

receiving a programming message during the programming timing period where the programming message specifies the function for which the radio frequency paging device will be responsive; and the radio frequency paging device programming itself using information in the programming message to enable performance of the function.

43. The method defined in claim 42 wherein the enable is an extended address enable.

44. A method for programming a radio frequency paging device to display a success message to indicate whether programming has been successful, said method comprising the steps of:

establishing a programming time period during which the radio frequency paging device will be responsive to programming messages;

receiving a programming message during the programming timing period, wherein the programming message specifies a displayable message to be displayed by the radio frequency paging device indicating status of programming of the radio frequency paging device; and the radio frequency paging device programming itself to display the displayable message based on whether the programming has been successful.

45. The method defined in claim 44 wherein the displayable message indicates programming failed and indicates what action to be taken by the user.

46. The method defined in claim 44 wherein the displayable message comprises a successful programming indication message.

47. A method for programming a plurality of communication devices at the same time, said method comprising the steps of:

sending an enable message to the pluarlity of communication devices simultaneously;

transmitting a single programming message to program the plurality of communication devices;

the communication devices receiving the programming message; and each of the communication devices undergoing the same programming using the single programming message.

48. The method defined in claim 47 wherein the programming message includes a group address to address each of the plurality of communication devices.

49. An apparatus for programming a radio frequency paging device, said apparatus comprising:

means for establishing a programming time period during which the radio frequency paging device will be responsive to programming messages;

means for receiving a programming message during the programming time period; and means for changing an operational parameter of the radio frequency paging device based on information in the programming message.

50. The apparatus defined in claim 49 wherein the means for establishing a programming time period comprises:

means for receiving an enable message that is being transmitted over the air; and means for starting the programming time period in response to the enable message.

51. The apparatus defined in claim 50 wherein the radio frequency paging device receives a unique message to enable receipt of programming messages.

52. The apparatus defined in claim 51 wherein the unique message is received by the radio frequency paging device using a base address.

53. The apparatus defined in claim 49 further comprising means for ignoring programming messages if not received by the radio frequency paging device during the programming time period.

54. The apparatus defined in claim 49 further comprising means for decrypting the programming message.

55. The apparatus defined in claim 49 further comprising means for verifying data in the programming message to determine whether the programming message is designated for the radio frequency paging device.

56. The apparatus defined in claim 49 further comprising means for decoding at least one field of one or more packets of the programming message to determine an action to be taken by the radio frequency paging device.

57. The apparatus defined in claim 49 further comprising means for disabling a programming address in the radio frequency paging device once the programming message has been received.

58. The apparatus defined in claim 57 wherein the programming address is disabled in the radio frequency paging device until re-enabled by another enable message.

59. The apparatus defined in claim 49 wherein the means for receiving the programming message comprises means for receiving the programming message having a base address of the radio frequency paging device and having at least one packet that indicates an action to be taken and information for performing the action.

60. The apparatus defined in claim 59 wherein the means for receiving the programming message further comprises means for receiving said at least one packet having a length indicative of an overall length of the information necessary to perform the action.

61. The apparatus defined in claim 49 further comprising means for displaying a success message indicating programming has been completed successively.

62. The apparatus defined in claim 49 further comprising means for displaying a fail message indicating programming has failed.

63. The apparatus defined in claim 62 further comprising means for displaying an action to be performed by a user of the radio frequency paging device in response to the fail message.

64. The apparatus defined in claim 49 wherein means for changing the operational parameter adds an address to which the radio frequency paging device is responsive.

65. The apparatus defined in claim 49 wherein the means for changing the operational parameter deletes an address to which the radio frequency paging device is responsive.

66. The apparatus defined in claim 49 wherein the means for changing the operational parameter deactivates the radio frequency paging device.

67. The apparatus defined in claim 49 wherein the means for changing the operational parameter enables or disables at least one function of the radio frequency paging device.

68. The apparatus defined in claim 49 further comprising the means for verifying programming information via a reverse channel.

69. The apparatus defined in claim 68 wherein the means for verifying comprises:

means for computing an error measure using the programming information; and means for sending a result via the reverse channel for confirmation.

* * * * *